(12) United States Patent
Popova et al.

(10) Patent No.: US 12,544,422 B2
(45) Date of Patent: Feb. 10, 2026

(54) USE OF GELSOLIN TO TREAT OR PREVENT LUNG INJURY AND DISEASE

(71) Applicant: The Regents of the University of Michigan, Ann Arbor, MI (US)

(72) Inventors: Antonia Popova, Ann Arbor, MI (US); Tracy Xiao Cui, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 890 days.

(21) Appl. No.: 17/778,634

(22) PCT Filed: Nov. 20, 2020

(86) PCT No.: PCT/US2020/061465
§ 371 (c)(1),
(2) Date: May 20, 2022

(87) PCT Pub. No.: WO2021/102235
PCT Pub. Date: May 27, 2021

(65) Prior Publication Data
US 2022/0409695 A1   Dec. 29, 2022

Related U.S. Application Data

(60) Provisional application No. 62/938,384, filed on Nov. 21, 2019.

(51) Int. Cl.
*A61K 38/17* (2006.01)
*A61P 11/00* (2006.01)

(52) U.S. Cl.
CPC .......... *A61K 38/1709* (2013.01); *A61P 11/00* (2018.01)

(58) Field of Classification Search
None
See application file for complete search history.

(56) References Cited

U.S. PATENT DOCUMENTS 9,316,639 B2   4/2016   Stossel et al.
10,022,424 B2  7/2018   Stossel et al.

FOREIGN PATENT DOCUMENTS

EP   1694342 A2   8/2006
WO   WO-2016033187 A1 * 3/2016  ............. A61K 38/00
WO   WO 2020/257743  12/2020

OTHER PUBLICATIONS

International Search Report and Written Opinion for PCT/US20/61465. Mailed Feb. 12, 2021. 9 pages.
Critical Biologics Corporation. Prediction. Prevention and Treatment of Life-Threatening Disease. 2008; 38 pages.
Cui et al., In Hyperoxia-Exposed Immature Mice, Gelsolin Protects from Rhinovirus-Induced pulmonary Infalmmation. A17 Viral Infection in Early Childhood. Mini Symposium May 2019. 2 pages.
Cui et al., In Neonatal Mice, Cd103+ Dendritic Cells and Clec9a Signaling Are Required for Hyperoxia-Induced Enhanced Inflammatory Responses to Rhinovirus Infection. Am J Respir Crit Care Med 195: A6386, 2017, 1 page.
Dinubile. Plasma gelsolin levels in the diagnosis, Prognosis and Treatment of Lung Complicaitons of Prematurity. American Journal of Respiratory and Critical Care Medicine. vol. 186, 2012; 1195-1196.
Ehrenkranz et al., Validation of the National Institutes of Health consensus definition of bronchopulmonary dysplasia. Pediatrics. Dec. 2005;116(6):1353-60.
Hanc et al., Structure of the Complex of F-Actin and DNGR-1, a C-Type Lectin Receptor Involved in Dendritic Cell Cross-Presentation of Dead Cell-Associated Antigens. Immunity. May 19, 2015;42(5):839- 849.
Hsia et al., An official research policy statement of the American Thoracic Society/European Respiratory Society: standards for quantitative assessment of lung structure. Am J Respir Crit Care Med. Feb. 15, 2010;181(4):394-418.
Jobe et al., Bronchopulmonary dysplasia. Am J Respir Crit Care Med. Jun. 2001;163(7):1723-9.
Kwiatkowski et al., Plasma and cytoplasmic gelsolins are encoded by a single gene and contain a duplicated actin-binding domain. Nature. Oct. 1986;323(6087):455-8.
Martin et al., Efficient neutralization and disruption of rhinovirus by chimeric ICAM-1/immunoglobulin molecules. J Virol. Jun. 1993;67(6):3561-8.
Newcomb et al., Phosphatidylinositol 3-kinase is required for rhinovirus-induced airway epithelial cell interleukin-8 expression. J Biol Chem. Nov. 4, 2005;280(44):36952-61.
Popova et al., Glycogen synthase kinase-3β/β-catenin signaling regulates neonatal lung mesenchymal stromal cell myofibroblastic differentiation. Am J Physiol Lung Cell Mol Physiol. Sep. 2012;303(5):L439-48.
Remington's Pharmaceutical Sciences, Mack Publishing Company, 1985. TOC only. 4 pages.
Stoll et al., Trends in Care Practices, Morbidity, and Mortality of Extremely Preterm Neonates, 1993-2012. JAMA. Sep. 8, 2015;314(10):1039-51.
Yang et al., Delayed administration of recombinant plasma gelsolin improves survival in a murine model of penicillin-susceptible and penicillin-resistant pneumococcal pneumonia. The Journal of Infectious Diseases. 2019; 220: 1498-502.
Zasada et al., Comparative two time-point proteome analysis of the plasma from preterm infants with and without bronchopulmonary dysplasia. Italian Journal of Pediatrics. 2019; 45:112, 1-9.

* cited by examiner

*Primary Examiner* — Noble E Jarrell
(74) *Attorney, Agent, or Firm* — Casimir Jones, S.C.; Kelly A. Barton

(57) ABSTRACT

The present disclosure provides methods, uses, and pharmaceutical compositions with utility in the treatment of acute lung injuries or chronic lung diseases including, bronchopulmonary dysplasia and exacerbations of bronchopulmonary dysplasia.

18 Claims, 10 Drawing Sheets

Gelsolin *in vivo*

USE OF GELSOLIN TO TREAT OR PREVENT LUNG INJURY AND DISEASE

CROSS-REFERENCE TO RELATED APPLICATIONS

This application claims the benefit of U.S. Provisional Application No. 62/938,384, filed on Nov. 21, 2019, the contents of which is incorporated herein by reference.

STATEMENT REGARDING FEDERALLY SPONSORED RESEARCH

This invention was made with government support under HL140572 awarded by the National Institutes of Health. The government has certain rights in the invention.

FIELD

The present disclosure provides methods of treating and preventing acute lung injury or exacerbations of chronic lung disease with gelsolin.

BACKGROUND

Bronchopulmonary dysplasia (BPD), also known as chronic lung disease of prematurity, is the most common chronic pulmonary complication of preterm birth and is most commonly seen in premature infants who required mechanical ventilation and/or oxygen therapy. The overall annual cost of treating BPD in the US was estimated to be $2.4 billion in 2008. While mortality from respiratory distress syndrome, which often precedes BPD development, has decreased in the surfactant era, the incidence of BPD has increased. In 2015, it was estimated that there are more than 12,000 new cases of BPD annually. Prematurely born infants, especially infants with bronchopulmonary dysplasia (BPD) have a high risk of viral-induced exacerbations and asthma later in life. BPD is responsible for approximately 15% of all pediatric asthma cases.

SUMMARY

Disclosed herein are methods of treating a subject having or at risk of developing a lung disease or disorder, the method comprising administering an effective amount of gelsolin to the subject. Also disclosed herein are pharmaceutical compositions for the treatment of a subject having or at risk of developing a lung disease or disorder comprising an effective amount of gelsolin; and a pharmaceutically acceptable carrier. Further disclosed is the use of gelsolin in the manufacture of a medicament for the treatment or prevention of a lung disease or disorder.

In some embodiments, the lung disease or disorder comprises bronchopulmonary dysplasia or an exacerbation of bronchopulmonary dysplasia. In some embodiments, the subject is an infant or child who requires or has a history of respiratory support. In some embodiments, the gelsolin is administered to the lung.

Other aspects and embodiments of the disclosure will be apparent in light of the following detailed description and accompanying figures.

BRIEF DESCRIPTION OF THE DRAWINGS

FIG. 4A is a graph of F-actin levels in hyperoxic BALF supernatant showing a decrease upon in vitro incubation with increasing doses of human gelsolin. FIG. 4B is the experimental timeline of fourteen-day-old wild type mice inoculated with hyperoxic BALF and RV1B, followed by gelsolin treatment intranasally, and a graph of whole lung IL-12p40 mRNA expression examined 2 days after RV1B infection.

DETAILED DESCRIPTION

Figure 1A:
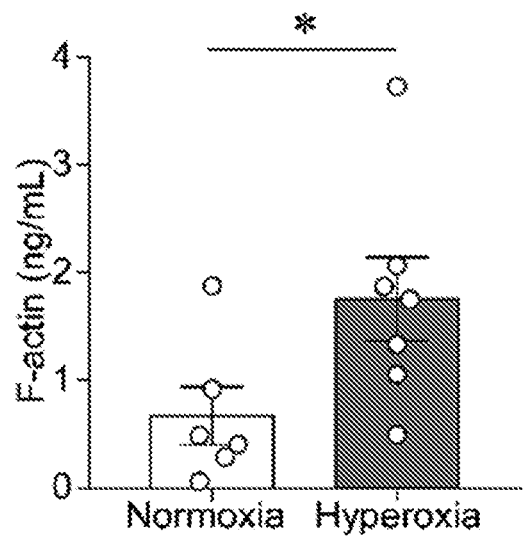
FIG. 1A and 1B are graphs showing F-actin (FIG. 1A) and dead cell number (FIG. 1B) in mouse bronchoalveolar lavage fluid (BALF) following exposure of immature 21-day-old wild type mice to normoxia or hyperoxia for 3 days.

The present disclosure provides methods, uses, and pharmaceutical compositions for use in the treatment of acute lung injuries or chronic lung diseases including, bronchopulmonary dysplasia and exacerbations of bronchopulmonary dysplasia.

Section headings as used in this section and the entire disclosure herein are merely for organizational purposes and are not intended to be limiting.

1. Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Unless otherwise defined herein, scientific and technical terms used in connection with the present disclosure shall have the meanings that are commonly understood by those of ordinary skill in the art. For example, any nomenclature used in connection with, and techniques of, cell and tissue culture, molecular biology, immunology, microbiology, and genetics described herein are those that are well known and commonly used in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

As used herein, the terms "administering," "providing", and "introducing," are used interchangeably herein and refer to the placement of the compounds (e.g., gelsolin) or compositions of the disclosure into a subject by a method or route which results in at least partial localization a desired site. The compounds or compositions can be administered by any appropriate route which results in delivery to a desired location in the subject.

As used herein, the term "child" refers to a subject between the ages of about 2 years old to about 10 years old.

As used herein, the term "infant" refers to a human subject between the ages of 0 days old to about 2 years old. In some embodiments, the infant is between 0 days and 1 year old. In some embodiments, the infant is a newborn. The term "newborn" or "neonate" refers to an infant in the first 28 days after birth, and applies to premature infants, postmature infants, and full-term infants.

A "peptide" or "polypeptide" is a linked sequence of two or more amino acids linked by peptide bonds. The peptide or polypeptide can be natural, synthetic, or a modification or combination of natural and synthetic. Polypeptides include proteins such as binding proteins, receptors, and antibodies. The proteins may be modified by the addition of sugars, lipids or other moieties not included in the amino acid chain. The terms "polypeptide" and "protein," are used interchangeably herein.

As used herein, the term "preventing" refers to partially or completely delaying onset of a disease, disorder and/or condition; partially or completely delaying onset of one or more symptoms, features, or manifestations of a particular disease, disorder, and/or condition; partially or completely delaying progression from a particular disease, disorder and/or condition; and/or decreasing the risk of developing pathology associated with the disease, disorder, and/or condition.

As used herein, the term "respiratory support" refers to any intervention that treats respiratory illness including, for example, the administration of supplemental oxygen, mechanical ventilation, CPAP, and albuterol treatment.

As used herein, the term "respiratory distress syndrome" or "RDS" refers to a breathing disorder that commonly affects newborns, affecting nearly all newborns who are born before 28 weeks of pregnancy, due to the inability to make enough surfactant thereby resulting in collapse of the air sacs in the lungs and preventing proper breathing. RDS usually develops in the first 24 hours after birth but can also affect adults. Symptoms of RDS include, but are not limited to, labored or shallow, rapid breathing, muscle fatigue or general weakness, low blood pressure, discolored skin or nails (cyanosis), flaring of the nostrils, and rapid pulse. Methods of diagnosing respiratory distress syndrome are well-known in the art.

As used herein, "treat," "treating" and the like means a slowing, stopping or reversing of progression of a disease or disorder when provided a composition described herein to an appropriate control subject. The term also means a reversing of the progression of such a disease or disorder. As such, "treating" means an application or administration of the methods, compounds, or compositions described herein to a subject, where the subject has a disease or a symptom of a disease, where the purpose is to cure, heal, alleviate, relieve, alter, remedy, ameliorate, improve or affect the disease or symptoms of the disease.

A "subject" or "patient" may be human or non-human and may include, for example, animal strains or species used as "model systems" for research purposes, such a mouse model as described herein. Likewise, patient may include either adults or juveniles (e.g., children). Moreover, patient may mean any living organism, preferably a mammal (e.g., human or non-human) that may benefit from the administration of compositions contemplated herein. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one embodiment of the methods and compositions provided herein, the mammal is a human.

Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

2. Treat or Prevent Lung Injury and Disease

The present disclosure provides methods for treating and preventing acute lung injury or exacerbations of chronic lung disease comprising administering an effective amount of gelsolin to the subject.

a. Bronchopulmonary Dysplasia

In some embodiments, the subject has or is at risk of developing a bronchopulmonary dysplasia.

Bronchopulmonary dysplasia (BPD), also referred to as chronic lung disease (CLD), is a common, occasionally life threatening, lung disease. In some embodiments, the subject is an infant. In select embodiments, the subject is a newly born infant, particularly, an infant less than about 3 weeks of age. In select embodiments, the infant requires respiratory support. In select embodiments, the infant is a premature infant. In certain embodiments, the infant has respiratory distress syndrome (RDS). In certain embodiments, the infant may require respiratory support but does not necessarily exhibit clinical symptoms of respiratory distress syndrome. The infant either may have not been diagnosed with RDS or may have not been treated for RDS.

Administration of gelsolin can be initiated as soon as it is determined that the subject has or is at risk of developing BPD. For example, in infants, the administration may be initiated at postnatal day 0, 1, 2, 3, 4, 5, 6, 7, 8, 9, 10, 11, 12, 13, or 14. Administration in infants may be initiated between postnatal day 1 to day 10. In some embodiments, administration may be after postnatal day 10, including, for example, day 14, day 18, day 21, day 28, or later.

The administration may continue until a postnatal age of about 1 to 6 weeks. The administration may continue until the infant is about 1 week old, about 2 weeks old, about 3 weeks old, about 4 weeks old, about 5 weeks old, or about 6 weeks old. In some embodiments, the administration continues until the infant no longer requires respiratory support.

b. Exacerbation of Bronchopulmonary Dysplasia

In some embodiments, the subject has or is at risk of developing an exacerbation of bronchopulmonary dysplasia. Exacerbation refers to acute deterioration of symptoms and lung function, which often results in respiratory failure. Exacerbations may include, for example, infectious agents (e.g., viruses, bacteria, and fungi), air pollution, and smoke.

In some embodiments, the exacerbation of bronchopulmonary dysplasia is virus-induced. Common viruses which may exacerbate BPD include, but are not limited to, respiratory syncytial virus, rhinovirus, influenza virus, adenovirus, and other viruses commonly responsible for respiratory tract infections.

In some embodiments, the subject having or at risk of developing an exacerbation of bronchopulmonary dysplasia is an infant or child. In some embodiments, the subject has a history of premature birth, BPD, ventilator use, or any combination thereof. In certain embodiments, the subject is an infant recently weaned off supplemental oxygen.

Administration of gelsolin may be initiated as soon as it is recognized that the subject is experiencing symptoms of an exacerbation of BPD. Administration may be initiated during times of extreme or high risk for a subject. For example, for a subject at high risk, an infant or child with a history of premature birth, BPD, or ventilator use, administration may be initiated during viral season or during an outbreak of viral infectivity within the community.

c. Gelsolin

As used herein the term "gelsolin" refers to wild type gelsolin or any functionally equivalent fragments or derivatives gelsolin. Wild type gelsolin (Kwiatkowski D J, et al. Nature. 1986;323:455, herein incorporated by reference in its entirety) has both cytoplasmic (cGSN) and secreted or exported isoforms, known as plasma gelsolin (pGSN), which are derived by alternative splicing of the message from a single gene. Wild type gelsolin may be purified from native or recombinant sources, as well as produced synthetically.

Functionally equivalent derivatives of gelsolin are derivatives which possess substantially similar function to wild type gelsolin. Gelsolin derivatives include biologically active amino acid sequences similar to the gelsolin sequences but differing due to amino acid substitutions, additions, deletions, post-translational modifications, or other modifications. In some embodiments, the derivatives may improve gelsolin's solubility, absorption, biological half-life, purification, or eliminate or lessen any toxicity or undesirable side effects of gelsolin. Gelsolin fragments refer to any portion of the gelsolin protein which maintains substantially similar bioactivity to that of wild type gelsolin. The fragments may be naturally-occurring peptide sequences, synthetic or chemically synthesized peptides or genetically engineered peptide sequences. Gelsolin bioactivities are known to, and easily assayed by, those of ordinary skill in the art, and include, for example stimulation of actin nucleation or actin severing/depolymerization.

Functional equivalent derivatives of gelsolin may also encompass other members of the gelsolin family of proteins. The gelsolin family of proteins regulate the dynamic remodeling of the actin cytoskeleton via actin nucleating, severing, capping and bundling activities. These proteins typically possess multiple, commonly three or six, repeats of gelsolin-like domains. The gelsolin-like domains share conserved protein sequences and three-dimensional structures. Members of the gelsolin family include, but are not limited to, advillin, villin, capG, flightless proteins, fragmin, adseverin, severin, supervillin, GSNL-1, and protovillin.

Functional equivalent derivatives of gelsolin may also include other actin filament severing/depolymerizing proteins not classified in the gelsolin family of proteins. Other actin filament severing proteins include, but are not limited to, members of the ADF/cofilin family (e.g., actin-depolymerizing factor (also known as ADF, destrin, and DSTN), cofilin, cofilin-1, and cofilin-2), and formins (e.g., FRL-α and INF2).

d. Administration & Dosing

The gelsolin may be administered by any desired route, including, but not limited to, inhalation, orally, intranasally, or parenteral administration (subcutaneous, intravenous or intramuscular injection or infusion).

In some embodiments, the gelsolin is administered to the lung. Methods of administering to the lungs include, for example, endotracheal administration, aerosolization and inhalation. In certain embodiments, the administration is by inhalation. The term inhalation includes, for example, both inhalation of a dry powder and inhalation of a wet aerosol. In certain embodiments, a nebulizer such as a jet nebulizer, ultrasonic nebulizer, vibrating mesh nebulizer, e.g. in the form of aqueous drug solutions or dispersions, may be used for the administration. In certain embodiments, an inhaler such as a metered dose inhaler, soft mist inhaler, an insufflator, or a dry powder inhaler may be used for the administration. In certain embodiments, the administration is through a mechanical means or along with respiratory support such as mechanical ventilation (conventional or high frequency ventilation), administration of supplemental oxygen, or continuous positive airway pressure (CPAP) including nasal CPAP (nCPAP) treatment, face mask, oxygen hood, or the like. The employment of some of the devices may involve the use of various respiratory gases, as would be appreciated by the skilled artisan. Respiratory gases used for noninvasive pulmonary respiratory therapy are some-times referred to herein as "CPAP gas," "CPAP air," "nCPAP", "ventilation gas," "ventilation air," or simply "air."

Solid or liquid particulate forms of gelsolin prepared for practicing the pulmonary delivery of present invention should include particles of respirable size: that is, particles of a size sufficiently small to pass through the mouth and larynx upon inhalation and into the bronchi and alveoli of the lungs of a subject. In general, particles ranging from about 1 to 10 microns in size are within the respirable range. In some embodiments, the particle size is extra-fine particle delivery, for example, less than 2.5 microns. Not to be bound by any theory, but smaller particle size may lead to increased efficacy of delivery of the composition. Particles of non-respirable size which are included in the aerosol tend to be deposited in the throat and swallowed, and the quantity of non-respirable particles in the aerosol is preferably minimized.

The specific dose level may depend upon a variety of factors including the age, body weight, and general health of the subject, time of administration, and route of administration. An "effective amount" is an amount that is delivered to a subject, either in a single dose or as part of a series, which achieves a medically desirable effect. For prophylaxis purposes, the amount of gelsolin in each dose is an amount which induces a protective result without significant adverse side effects.

In some embodiments, the effective amount of gelsolin is 0.01-100 mg/kg (e.g., 0.1 to 10 mg/kg, 0.01-50 mg/kg, 0.1-100 mg/kg), The effective amount may be greater than. 0.1 mg/kg, 0.5 mg/kg, 1.0 mg/kg, 1.5 mg/kg, 2.0 mg/kg, 0.1 mg/kg, 2.5 mg/kg, 3.0 mg/kg, 3.5 mg/kg, 4.0 mg/kg, 4.5 mg/kg, 5.0 mg/kg, 5.5 mg/kg, 6.0 mg/kg, 6.5 mg/kg, 7.0 mug/kg, 7.5 mg/kg, 8.0 mg/kg, 8.5 mg/kg, 9.0 mg/kg, or 9.5 mg/kg. The effective amount may be less than 10.0 mg/kg, 9.5 mg/kg, 9.0 mg/kg, 8.5 mg/kg, 8.0 mg/kg. 7.5 mg/kg, 7.0 mg/kg, 6.5 mg/kg, 6.0 mg/kg, 5.5 mg/kg, 5.0 mg/kg, 4.5 mg/kg, 4.0 mg/kg, 3.5 mg/kg, 3.0 mg/kg. 2.5 mg/kg. 2.0 mg/kg, 1.5 mg/kg, 1.0 mg/kg, or 0.5 mg/kg. In certain embodiments, the effective amount of gelsolin is 0.1-1 mg/kg.

The frequency of dosing the effective amount can vary, but typically the effective amount is delivered daily, either as a single dose, multiple doses throughout the day, or depending on the dosage form, dosed continuously for part or all of the treatment period.

In some embodiments, the effective amount is delivered more than once daily, for example every 6-8 hours or 2-4 times daily. In some embodiments, the effective amount is delivered less than once daily, for example, every 2 days, twice weekly, or once weekly. In other embodiments, the patient can be dosed more frequently early in the treatment regimen, with decreasing frequency later in the treatment regimen, e.g., once every day for one week, followed by twice weekly until the end of the treatment period.

In some embodiments, the gelsolin is administered for one to four weeks. In some embodiments, gelsolin is administered for about 1 week, about 2 weeks, about 3 weeks or about 4 weeks. In some embodiments, the gelsolin is administered for about 1, 2, 3, 4, 5, 6, 7, 8, 9, 10, 11, 12, 13, or 14 days.

In some embodiments, gelsolin is administered therapeutically, in response to a diagnosis or suspicion of bronchopulmonary dysplasia or exacerbations of bronchopulmonary dysplasia. Treating of bronchopulmonary dysplasia or exacerbations thereof, includes, but is not limited to, reducing, inhibiting, or preventing one or more symptoms of BPD or exacerbations thereof, or delaying the progression of BPD or exacerbations thereof. In some embodiments, gelsolin is administered prophylactically, such that it is used to prevent or delay the onset of, or lessen the severity of bronchopulmonary dysplasia or the exacerbations of bronchopulmonary dysplasia.

The gelsolin may be administered in a pharmaceutical composition which further comprises pharmaceutically acceptable carriers. The choice of excipients or pharmaceutically acceptable carriers will depend on factors including, but not limited to, the particular mode of administration, the effect of the excipient on the solubility and stability of gelsolin, and the nature of the dosage form.

Pharmaceutically acceptable carriers may include any and all solvents, dispersion media, coatings, antibacterial and antifungal agents, isotonic and absorption delaying agents. In one embodiment, the carrier may be suitable for inhalation administration. Alternatively, the carrier can be suitable for intravenous, parenteral, intraperitoneal, intramuscular, sublingual or oral administration. Pharmaceutically acceptable carriers include sterile aqueous solutions or dispersions and sterile powders for the extemporaneous preparation of sterile injectable solutions or dispersions. The pharmaceutical composition may optionally be combined with a carrier to aid in dispersion or transport of respiratory particles. For example, a suitable carrier such as a sugar (e.g., lactose, sucrose, trehalose, mannitol) may be blended with the gelsolin in any suitable ratio (e.g., a 1 to 1 ratio by weight).

Suitable compositions for use in nebulizers comprise the active ingredient in a liquid carrier, the active ingredient comprising up to 40% w/w of the composition, but in some embodiments, preferably less than 20% w/w. In some embodiments, the carrier is water (and most preferably sterile, pyrogen-free water), a dilute aqueous buffered saline, or a dilute isotonic or hypertonic alcohol solution. Optional additives include preservatives if the composition is not made sterile, for example, methyl hydroxybenzoate, antioxidants, volatile oils, buffering agents and surfactants.

Suitable compositions for use in aerosol generators may comprise or consist either solely of the active ingredient or of a powder blend comprising the active ingredient, a suitable powder diluent, such as lactose, and an optional surfactant. The active ingredient typically comprises from 0.1 to 100 w/w of the composition. Suitable propellants for aerosol devices include certain chlorofluorocarbon compounds, for example, dichlorodifluoromethane, trichlorofluoromethane, dichlorotetrafluoroethane and mixtures thereof. The composition may additionally contain one or more co-solvents, for example, water, saline, ethanol, surfactants, such as oleic acid or sorbitan trioleate, antioxidants and suitable flavoring agents.

The use of such pharmaceutically acceptable carriers for pharmaceutically active substances is well known in the art. The compositions and methods for their preparation will be readily apparent to those skilled in the art. Techniques and formulations may be found, for example. in Remington's Pharmaceutical Sciences, 19th Edition (Mack Publishing Company, 1995).

3. Kits

The present disclosure provides kits treating and preventing acute lung injury or exacerbations of chronic tuna disease comprising administering an effective amount of gelsolin to the subject.

The kit may comprise an effective amount of gelsolin, or a pharmaceutical composition thereof, and an inhalation delivery device. The inhalation delivery device may include, for example, a nebulizer, an inhaler, or a respiratory delivery medical device (e.g., a mechanical ventilator, a CPAP machine).

In some embodiments, the gelsolin, or a pharmaceutical composition thereof, is provided in individual unit dose forms. In some embodiments, the gelsolin, or a pharmaceutical composition thereof is provided as multiple unit dosage forms (e.g. an inhaler with a metering value to supply individual dosages of the gelsolin).

In some embodiments, the kit further comprises instructions for using the components of the kit. The instructions are relevant materials or methodologies pertaining to the kit. The materials may include any combination of the following: background information, list of components and their availability information (purchase information, etc.), brief or detailed protocols for using the kit, trouble-shooting, references, technical support and any other related documents. Instructions can be supplied with the kit or as a separate member component, either as a paper form or an electronic form which may be supplied on computer readable memory device or downloaded from an internet website, or as recorded presentation.

In some embodiments, the instructions are in the forms of software for managing automated delivery (e.g., via infusion into respiratory delivery medical device). The software may be supplied with the system in any electronic form such as a computer readable device, an internet download, or a web-based portal. The software may control various parameters of the delivery, including for example, dosage amounts and volume.

It is understood that the disclosed kits can be employed in connection with the disclosed methods.

4. EXAMPLES

Materials and Methods

*Generation of RV.* RV1B (from American Type Culture Collection, Manassas, Va.) was grown in HeLa cells, concentrated, partially purified, and titered as described (Newcomb, D. C., et al., *J Biol. Chem* 280: 36952-36961). Viral titers were measured by plaque assay (Martin, S., et al., *J Viral* 67: 3561-3568).

Animal model. Two-day-old wild type C57BL/6J mice (Jackson Laboratories, Bar Harbor, Me.) were exposed to air or 75% oxygen for 9 days using a polypropylene chamber coupled to an oxygen controller and sensor (BioSpherix, Lacona, N.Y.). In select experiments, immature mice were treated with 10 ul of PBS (Sigma D6662) or 0.5 mg/kg human gelsolin (Cytoskeleton Inc., HPG6) intranasally daily during the first week of exposure and every other day ×3 doses. On DOL 11, the hyperoxic exposure was discontinued. On DOL 14 the mice were inoculated with 30 µl of RV1B (3×10$^8$ PFU/ml). Lungs were analyzed on DOL 14 or 2 days after RV infection. The animal experiments were performed in strict accordance with the NIH Guide for the Care and Use of Laboratory Animals recommendations.

F-actin and dead cell number in mouse bronchoalveolar lavage fluid Twenty-one-day-old wild type mice were exposed to normoxic or hyperoxic conditions. Bronchoalveolar lavage (BAL) was performed with 0.3 mL cold PBS. BAL cells were separated from supernatant by centrifugation, BALF supernatant (100 µl) was incubated with or without human gelsolin (5 or 10 µg) in vitro in room temperature for 10 min and F-actin levels were measured by ELISA (MyBioSource MBS702018). In selected experiments, fourteen-day-old wild type mice were inoculated with 15 µl hyperoxic-BALF intranasally, followed by 15 µl of RV1B (3×10$^8$ PFU/ml). Lungs were analyzed 2 days after RV infection.

Quantitative real-time PCR. Mouse whole-lung RNA was prepared using TRIzol (Invitrogen, Carlsbad, Calif.). Gene mRNA expression (IL-12p40, IFN-γ, TNF-α) was quantified using SYBR green technology. The level of gene expression was normalized to mRNA of GAPDH using the $2^{-\Delta CT}$ algorithm. For graphic representation, the mRNAs for the target genes relative to GAPDH were plotted multiplied by $10^{-3}$.

Measurement of cytokines. Whole mouse lung homogenates in PBS were centrifuged and supernatants were analyzed for pro-inflammatory cytokines. IL-12p40, IL-12p70, TNF-α and IFN-γ were measured by ELISA (all from R&D Systems, Minneapolis, Minn.).

Mouse lung histology. Lungs were perfused with 5 mM EDTA in PBS and inflated to 30 cmH$_2$O pressure with 10% buffered formalin phosphate (SF100-4, Fisher Scientific, Fair Lawn, N.J.). Five-micron thick paraffin sections were stained with hematoxylin and eosin and mean alveolar chord length was determined (Hsia, C.C., et al., *Am J Respir Crit Care Med* 181: 394-418).

Example 1

F-actin and Dead Cell Number in Mouse Bronchoalveolar Lavage Fluid

Figure 1B:
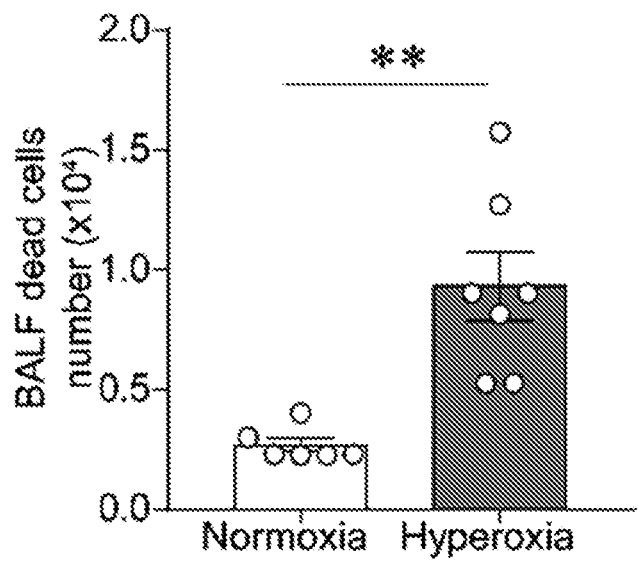
Figure 6A:
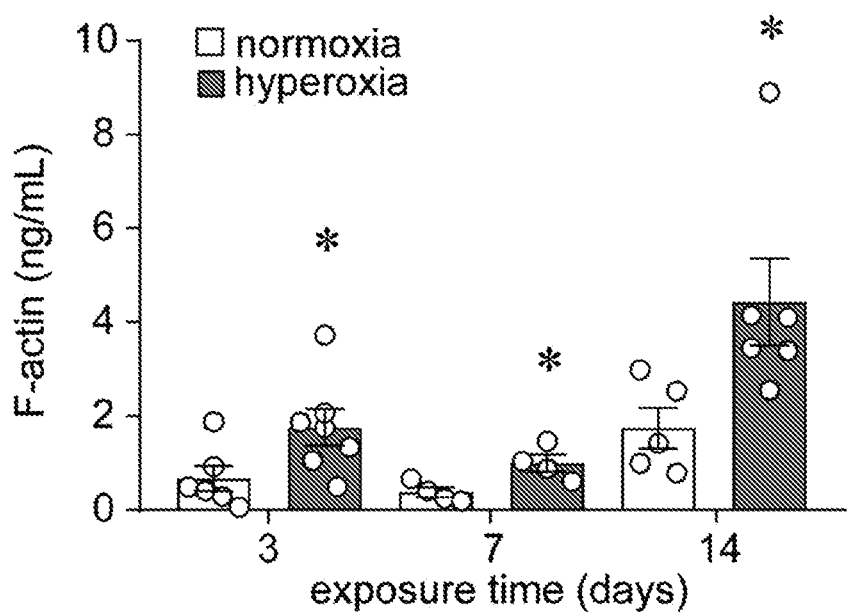
FIG. 6A and 6B are graphs showing F-actin (FIG. 6A) and dead cell number (FIG. 6B) in mouse bronchoalveolar lavage fluid (BALF) following exposure of immature 21-day-old wild type mice to nonnoxia or hyperoxia for 3, 7, or 14 days as indicated.
Figure 6B:
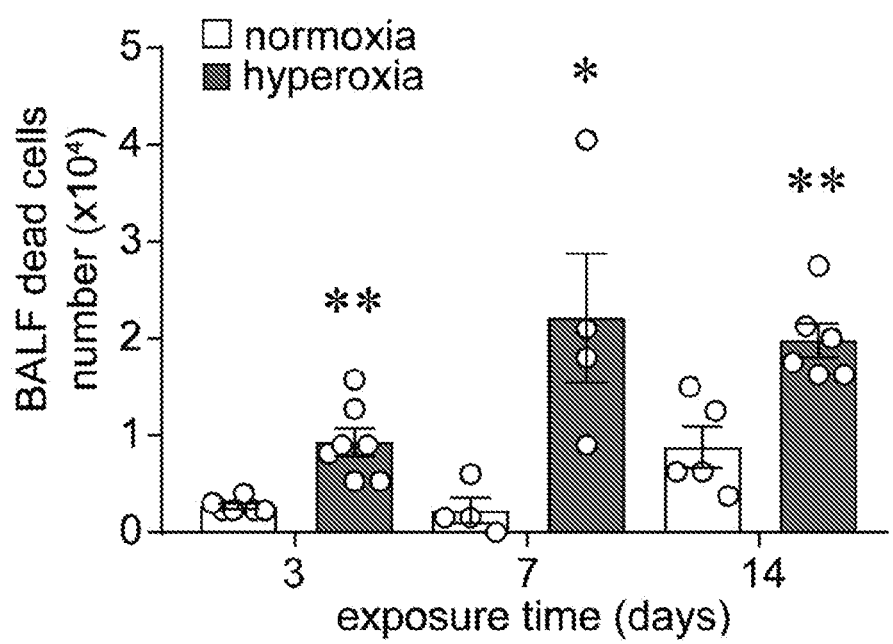

Supplemental oxygen therapy is a risk factor for development of BPD and long-term respiratory symptoms. Hyperoxic exposure may induce lung epithelial cell necrosis. F-actin release from dead cells has been shown to be a marker of tissue damage, correlating with the extent of injury. As shown in FIGS. 1 and 6, hyperoxia increased the dead cell number and F-actin levels in bronchoalveolar lavage fluid (BALF) supernatant. BAL was performed with 0.3 mL cold PBS following exposure to normoxia or hyperoxia for 3, 7, or 14 days of immature 21-day-old wild type mice. BAL cells were separated from supernatant by centrifugation. F-actin was measured by ELISA. Dead cells were counted.

Example 2

F-actin/Gelsolin Ratio in Mouse BALF

Gelsolin is an 86 kD, naturally occurring, calcium-regulated protein expressed in extracellular fluids, as well as intracellularly, that can depolymerize filamentous actin. Gelsolin has been shown to be reduced in patients in a variety of injury states, including acute lung injury. Low gelsolin plasma levels have been observed in preterm infants who died or developed BPD, compared to survivors without BPD.

Figure 2:
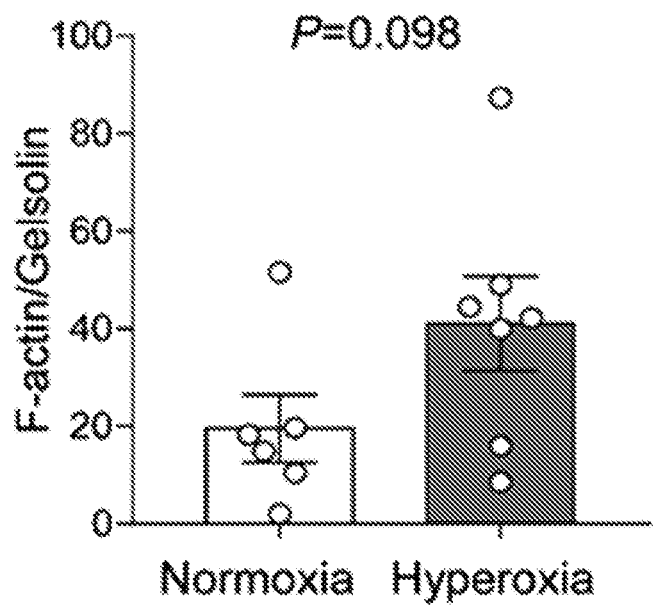
FIG. 2 is a graph of the F-actin/gelsolin ratio in mouse BALF following exposure of immature 21-day-old wild type mice to normoxia or hyperoxia for 3 days.

Immature 21-day-old wild type mice were exposed to normoxia or hyperoxia for 3 days. F-actin and gelsolin levels were measured and the ratio of F-actin to gelsolin protein levels was calculated in BALF supernatants from normoxia- and hyperoxia-exposed immature mice. It was found that F-actin/gelsolin ratios were higher in hyperoxic BALF supernatants, indicating greater increase in F-actin upon exposure to hyperoxia (FIG. 2).

Example 3

Gelsolin Prevents Hyperoxic Exposure-Induced Inflammatory Response

Figure 3A:
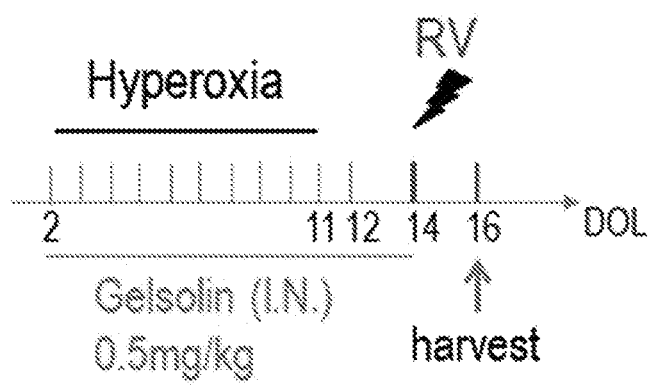
FIG. 3A is the experimental timeline for the treatment of two-day-old wild type mice exposed to normoxia or hyperoxia for 9 days and treated with PBS or human gelsolin once daily during the first week of exposure and subsequently every other day ×3 doses. On day-of-life (DOL) 14 the mice were inoculated with rhinovirus 1B (RV1B) and whole lung gene expression was analyzed 2 days after RV1B infection.
Figure 3B:
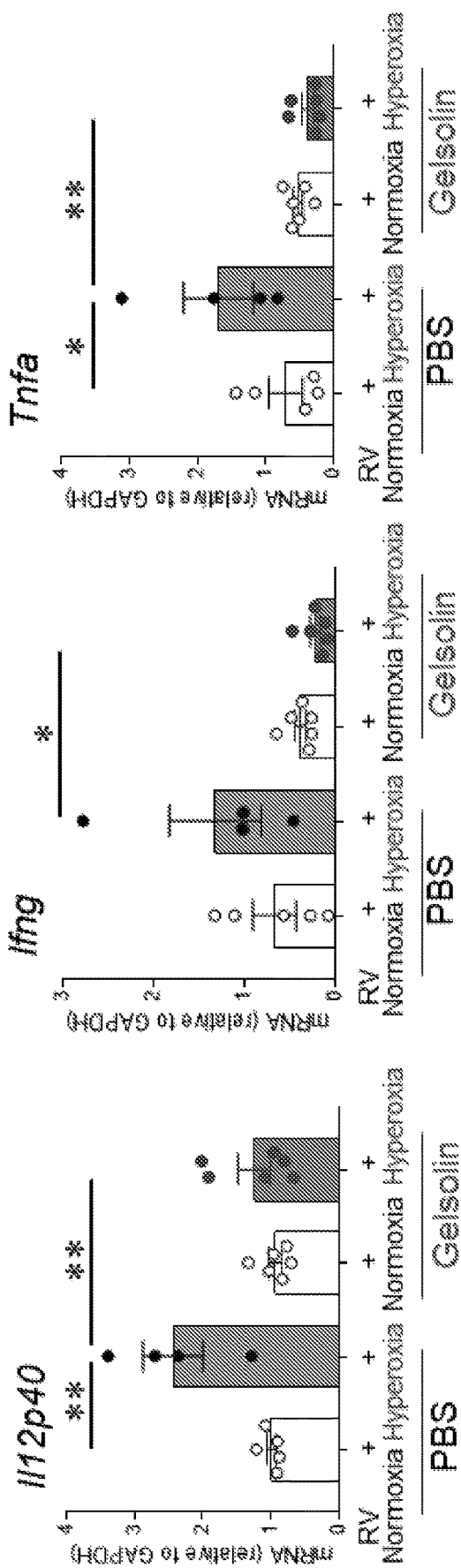
FIGS. 3B and 3C are graphs of the quantitation of whole lung IL-12p40, IFN-$\gamma$ and TNF-$\alpha$. mRNA (FIG. 3B) and IL-12p70, IFN-$\gamma$ and TNF-$\alpha$ protein (FIG. 3C) following RV1B inoculation and PBS or gelsolin treatment to mice exposed to normoxia or hyperoxia, as shown in the timeline of FIG. 3A.
Figure 3C:
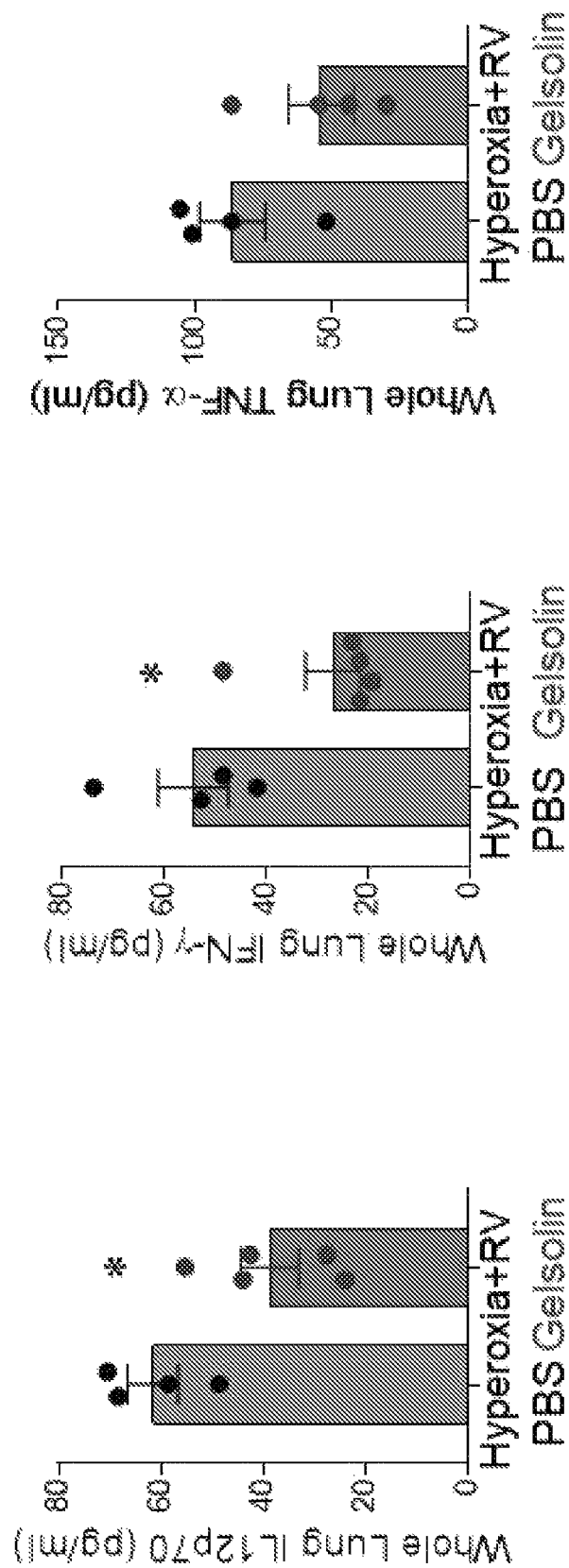

In hyperoxia-exposed immature mice, the ability of gelsolin to prevent CD103+Clec9a+ DC-mediated inflammatory responses to RV was investigated. Gelsolin was administered intranasally to neonatal mice during hyperoxic exposure. On DOL14 the mice were infected with RV. Lung inflammatory responses were assessed 2 days later. In RV-infected mice prior hyperoxic exposure induced type 1 cytokine expression, including Il12, Ifng and Tnfa mRNA. This response was blocked by gelsolin treatment (FIG. 3). Protein expression of IL12p70, IFN-γ and TNF-α was also blocked by gelsolin treatment compared with IgG control, indicating that gelsolin blocked the hyperoxia-induced pro-inflammatory response to RV.

Example 4

Gelsolin Blocks Hyperoxic BALF-Induced Inflammatory Response

Figure 4A:
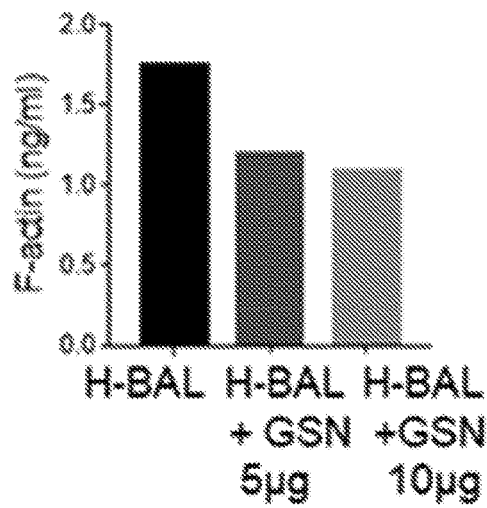
FIGS. 4A and 4B demonstrate that in vivo treatment with gelsolin blocks hyperoxic BALF-induced inflammatory response to rhinovirus (RV).
Figure 4B:
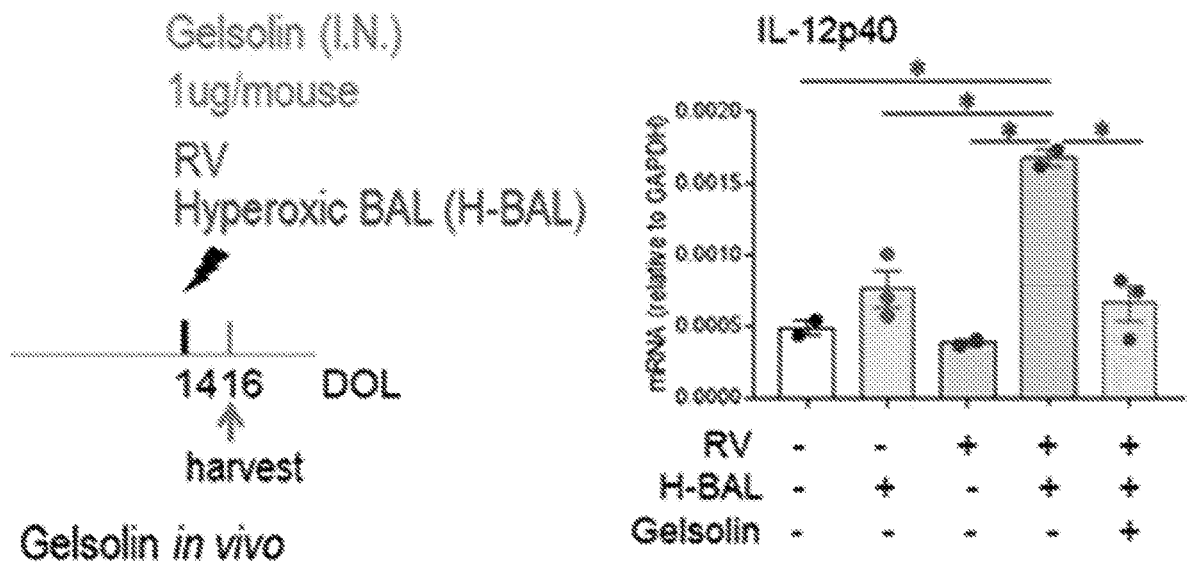

As shown above hyperoxic exposure increased F-actin levels in BALF supernatants. The ability of gelsolin to decrease the concentration of F-actin in hyperoxic BALF supernatants was assessed in an in vitro experiment. Incubation of hyperoxic BAL with gelsolin decreased F-actin concentration in a dose-dependent manner (FIG. 4A). An in vivo experiment was designed for further investigation. Immature mice were inoculated with hyperoxic BAL and RV, followed by gelsolin on DOL14. Mouse lung IL-12 mRNA expression was assessed 2 days later, IL12 mRNA expression was increased by hyperoxic BAL, and further increased by hyperoxic BAL with RV treatment. Gelsolin blocked the induction of IL12 mRNA expression (FIG. 4B).

Together, these results indicated that human gelsolin prevents the hyperoxia-induced pro-inflammatory response to RV and finds use as a prophylactic therapy for viral-induced exacerbations of children with history of prematurity and BPD.

Example 5

Gelsolin Attenuates Hyperoxia-Induced Hypoalveolarization

Figure 5A:
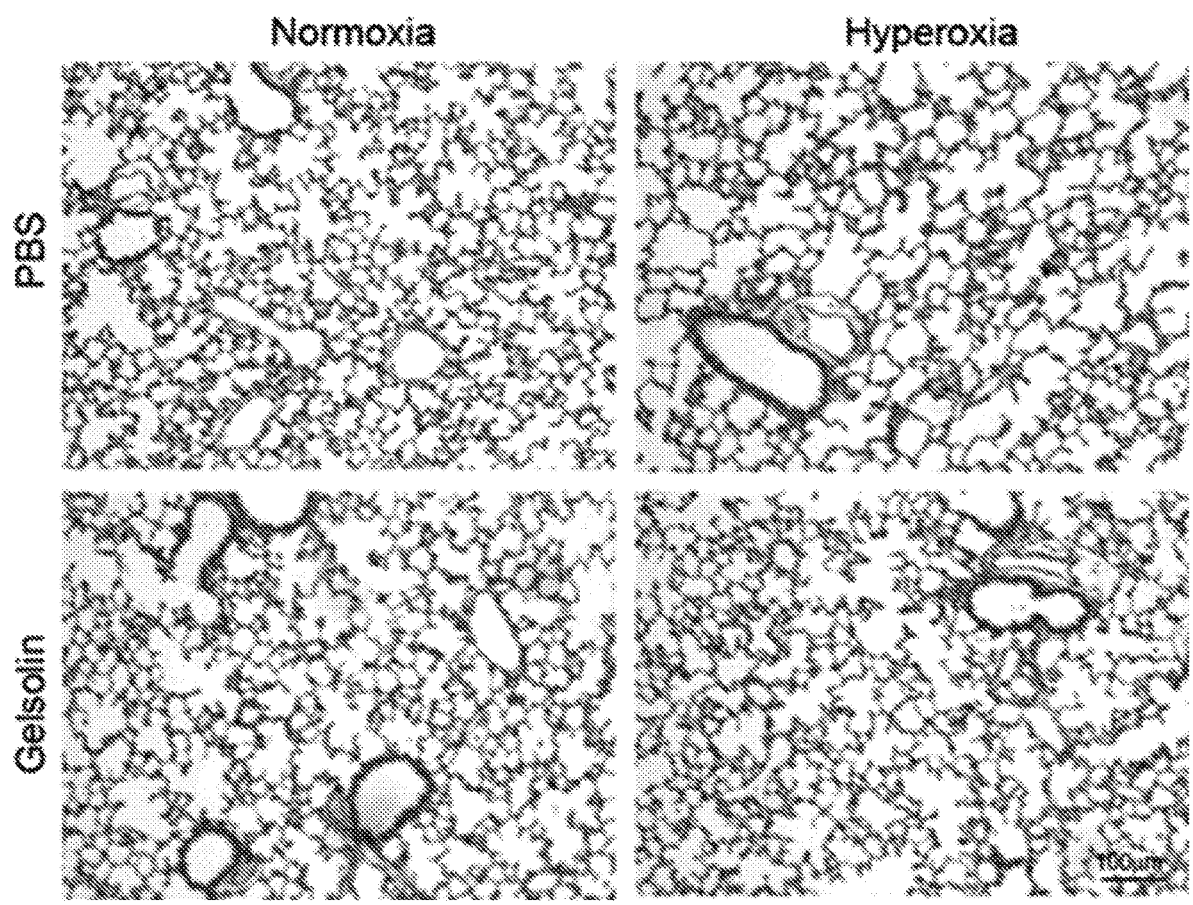
FIG. 5A are images of lung histology (H&E staining) on DOL14 of two-day-old wild type mice exposed to normoxia or hyperoxia for 9 days and treated with 1 Out of PBS or human gelsolin 0.5 mg/kg intranasally daily during the first week of exposure and subsequently every other day ×3 doses, as indicated.
Figure 5B:
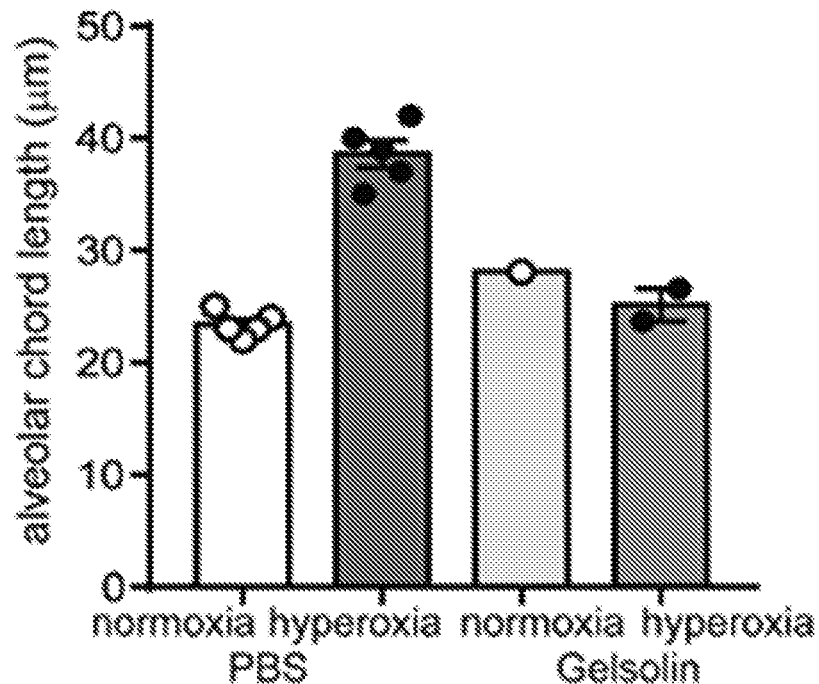
FIG. 5B is a graph of alveolar chord length examined on DOL14 of two-day-old wild type mice exposed to nomioxia or hyperoxia for 9 days and treated with 100 of PBS or human gelsolin 0.5 mg/kg intranasally daily during the first week of exposure and subsequently every other day ×3 doses, as indicated.
Figure 7A:
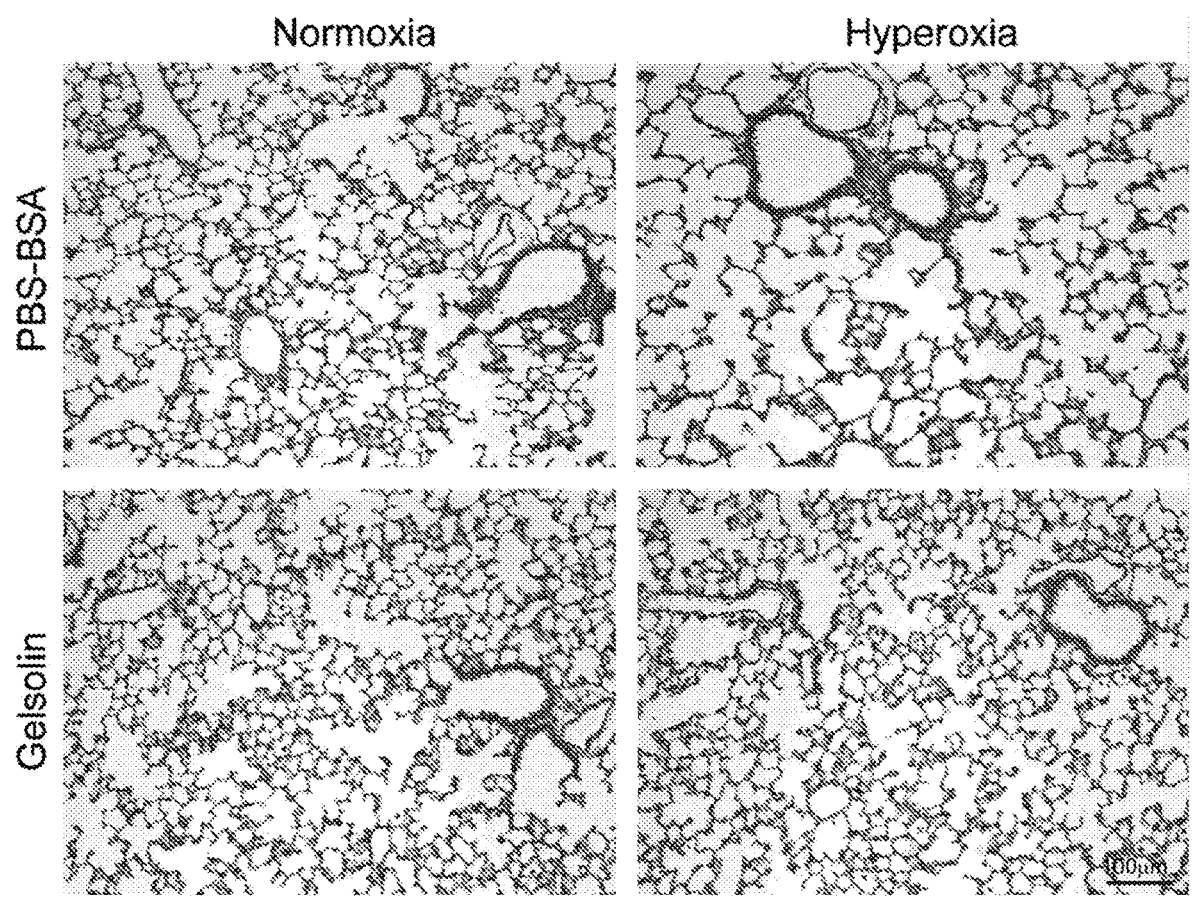
FIG. 7A are images of lung histology (H&E staining) on DOL14 of two-day-old wild type mice exposed to normoxia or hyperoxia for 9 days and treated with 1.0 ul of PBS+BSA or human gelsolin 0.5 mg/kg intranasally daily during the first week of exposure and subsequently every other day ×3 doses, as indicated.
Figure 7B:
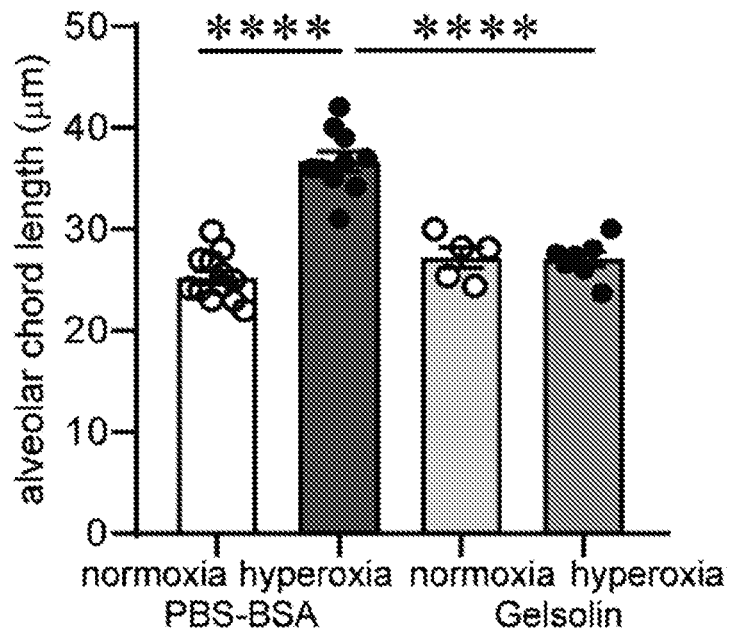
FIG. 7B is a graph of alveolar chord length examined on DOL14 of two-day-old wild type mice exposed to normoxia or hyperoxia for 9 days and treated with 10 ul of PBS-EBSA or human gelsolin 0.5 mg/kg intranasally daily during the first week of exposure and subsequently every other day ×3 doses, as indicated.

The main histopathological feature of BPD is hypoalveolarization. Hyperoxic exposure of immature mice induced similar hypoalveolarization. In additional pilot studies, human recombinant plasma gelsolin (0.5 mg/kg) was administered intranasally daily during the first week of hyperoxic exposure and every other day afterwards. Upon completion of hyperoxic exposure on day of life 16, gelsolin-treated mice showed attenuation of hyperoxia-induced hypoalveolarization (FIGS. 5A and 7A) as indicated by decreased chord lengths compared to hyperoxia-controls (FIGS. 5B and 7B).

These results show that human gelsolin prevents hypoalveolarization, the main histopathological feature of BPD. As such, it is contemplated that gelsolin finds use as an effective prophylactic treatment to prevent early death or BPD development after preterm birth as well as a treatment for of existing cases of BPD.

Example 6

Figure 8:
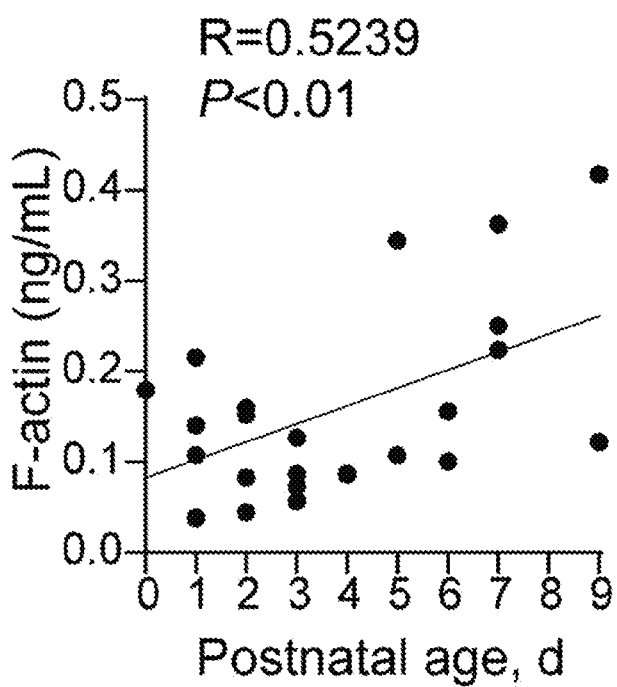
FIG. 8 is a graph of postnatal age (days) and F-actin concentration in tracheal aspirates from premature infants receiving mechanical ventilation for respiratory distress syndrome in the first 10 days of life.

Correlation Between Postnatal Age and Extracellular F-actin Levels in Tracheal Aspirate Supernatants Tracheal aspirates from infants admitted to the C.S. Mott Children's Hospital Newborn Intensive Care Unit were examined. Criteria for entry into the examination included gestational age at birth ≤32 weeks, mechanical ventilation for respiratory distress, and age ≤7 days. Aspirates were collected during routine tracheal suctioning of mechanically ventilated premature infants in the first 10 days of life. Tracheal aspirates were assayed for extracellular F-actin present in the supernatant using ELISA (MyBioSource). As shown in FIG. 8, there was a significant positive correlation between postnatal age in days and extracellular F-actin levels in tracheal aspirate supernatants.

It is understood that the foregoing detailed description and accompanying examples are merely illustrative and are not to be taken as limitations upon the scope of the disclosure, which is defined solely by the appended claims and their equivalents.

All publications and patents mentioned in the above specification are herein incorporated by reference as if expressly set forth herein. Various changes and modifications to the disclosed embodiments will be apparent to those skilled in the art and may be made without departing from the spirit and scope thereof.

What is claimed is:

1. A method of treating a subject having or at risk of developing a lung disease or disorder, the method comprising administering an effective amount of gelsolin to the subject,
wherein the lung disease or disorder comprises bronchopulmonary dysplasia or an exacerbation of bronchopulmonary dysplasia, and
wherein the gelsolin is plasma gelsolin or cytoplasmic gelsolin.

2. The method of claim 1, wherein the lung disease or disorder comprises bronchopulmonary dysplasia and the subject is an infant requiring respiratory support.

3. The method of claim 2, wherein the infant is a premature infant.

4. The method of claim 2, wherein the infant has respiratory distress syndrome.

5. The method of claim 2, wherein the gelsolin is administered up to a postnatal age of about 1 to 6 weeks.

6. The method of claim 1, wherein the lung disease or disorder comprises an exacerbation of bronchopulmonary dysplasia and the subject is an infant or child.

7. The method of claim 6, wherein the exacerbation of bronchopulmonary dysplasia is virus-induced.

8. The method of claim 6, wherein the subject has a history of premature birth.

9. The method of claim 6, wherein the subject has a history of bronchopulmonary dysplasia.

10. The method of claim 1, wherein the gelsolin is administered to the lungs.

11. The method of claim 1, wherein the gelsolin is administered by inhalation.

12. The method of claim 1, wherein the gelsolin is administered prophylactically.

13. The method of claim 1, wherein the effective amount of gelsolin is 0.1-10 mg/kg.

14. The method of claim 1, wherein the effective amount of gelsolin is administered daily.

15. The method of claim 1, wherein the gelsolin is administered for one to four weeks.

16. A kit comprising an effective amount of plasma gelsolin or cytoplasmic gelsolin and an inhalation delivery device.

17. The kit of claim 16, wherein the inhalation delivery device comprises a nebulizer, an inhaler, or a respiratory delivery medical device.

18. The method of claim 1, wherein the gelsolin is plasma gelsolin.

* * * * *